June 10, 1958  T. J. McMAHON  2,838,092
FABRIC LAPPING MEANS
Filed July 17, 1956  2 Sheets-Sheet 1

INVENTOR
Thomas J. McMahon
BY McCoy, Greene & H. Grotenhuis
ATTORNEYS

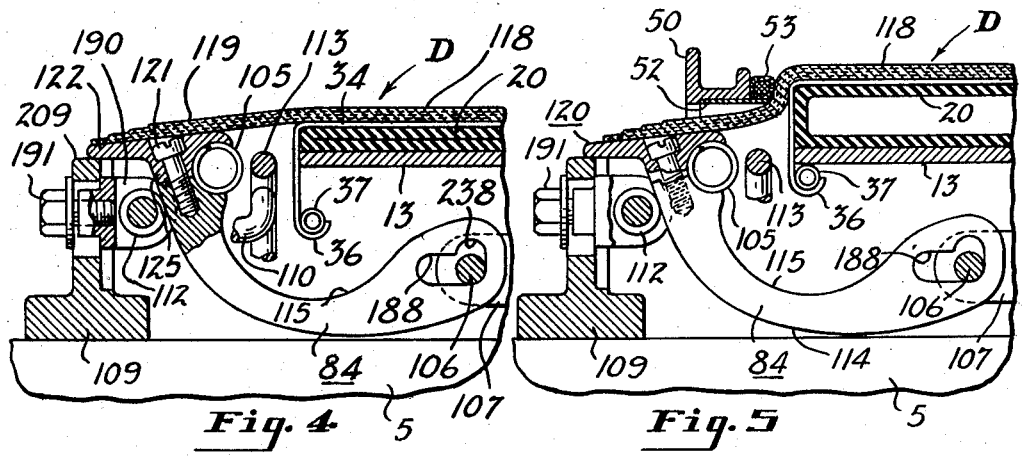

United States Patent Office
2,838,092
Patented June 10, 1958

2,838,092

FABRIC LAPPING MEANS

Thomas J. McMahon, Akron, Ohio, assignor to The General Tire and Rubber Company, Akron, Ohio, a corporation of Ohio Application July 17, 1956, Serial No. 598,404

6 Claims. (Cl. 154—9)

The present invention relates to an improved means for turning the fabric over the ends of a tire building drum in an automatic tire building machine and more particularly to a tire building machine having segments carried by the turn-over fingers.

In the copending application of Herman T. Kraft, Serial No. 528,996, filed August 17, 1955, a tire building machine is disclosed having a series of circumferentially spaced turn-over fingers that support a resilient constraining annulus or stitching ring in the form of a garter spring. The inner ends of the turn-over fingers are pivotally connected to an axially movable actuating member which moves the fingers against fulcrum members to swing the outer ends of the fingers and the garter spring carried thereby over the shoulders of the tire building drum.

The present invention relates to a similar type of tire building machine wherein each turn-over finger is provided with a segmental supporting member or shoe of substantial circumferential extent and preferably of arcuate shape for engaging the end portions of the fabric projecting beyond the ends of the drum. In the normal position of the turnover fingers, these segments are arranged end to end to form a generally cylindrical segmental ring for supporting the staggered end portions of the fabric. When the turnover fingers are actuated, the segments assist in turning the fabric over the bead rings so that the fabric is pulled tight around the bead rings. The action of the segments is such that the staggered end portions are smooth and properly adhered together and are not wavy or curled after they are turned over the beads and pressed against the underlying fabric on the drum. The segments substantially improve the quality of the tire built on the machine and facilitate high speed operation of the machine so as to lower the cost of manufacture.

An object of the present invention is to provide automatic means for properly turning fabric over the bead rings of a tire or a tire-building drum so that high quality tires can be manufactured economically at high speed.

A further object of the invention is to improve the quality of tires built by automatic tire building machines.

A still further object of the invention is to provide means for supporting the fabric end portions projecting beyond the ends of a tire building drum so that the plies of said end portions may be properly adhered together as they are applied to the drum.

Other objects, uses and advantages of the invention will become apparent to those skilled in the art from the following description and claims and from the drawings, in which:

Figure 4 is a fragmentary longitudinal vertical sectional view taken substantially on the line indicated at 4—4 in Fig. 2 on a reduced scale with parts broken away and shown in section, the parts being shown in their positions just after the four fabric plies have been applied to the drum;

Figure 5 is a fragmentary longitudinal vertical sectional view similar to Fig. 4 showing the position of the parts as the bead ring is pressed against the shoulder of the drum;

Figure 1:
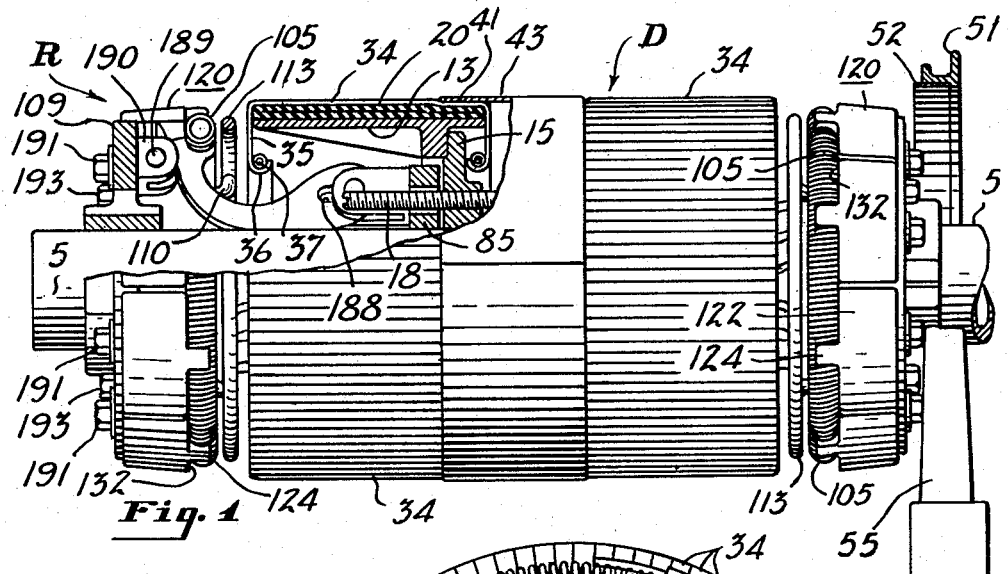
Figure 1 is a side elevational view in a reduced scale with parts broken away and shown in section illustrating the tire building machine of the present invention.

Figure 6 is a fragmentary longitudinal vertical sectional view showing the position of the parts as the turnover fingers lift the fabric end portions; and Figure 7 is a fragmentary longitudinal vertical sectional view showing in solid lines the position of the parts as the garter spring presses against the drum to stitch the fabric end portions, the position of the parts after the stitching ring has moved out of engagement with the fabric being shown in dot-dash lines.

Referring more particularly to the drawings which are drawn substantially to scale and in which like parts are identified by the same numerals throughout the several views, Figures 1 to 7 show a semi-automatic tire building machine for making pneumatic rubber tires according to the present invention. This machine is of the type shown in the copending application of Herman T. Kraft, Serial No. 528,996, filed August 17, 1955, and is somewhat similar to the semi-automatic machine shown in U. S. Patent No. 2,614,952, issued October 21, 1952.

The tire building machine of the present invention includes an expansible and contractible tire building drum D of the type shown in said copending application and said patent which is rigidly mounted on a hollow cylindrical motor-driven cantilever shaft 5 for rotation with said shaft about a horizontal axis. The drum D has rigid cylindrical supporting means including axially spaced generally cylindrical rigid annular members 13 concentric to the shaft 5 and rigid hub members or spiders 15 bolted or otherwise rigidly connected to the members 13 and keyed to the shaft 5 for rotation in unison therewith. A horizontal adjusting screw 18 extends through the hub members 15 and engages a rigid member at the central vertical plane of the drum to permit axial adjustment of the position of the hub members as explained in more detail in said copending application and said Patent No. 2,614,952. The screw 18 provides means for adjusting the width of the drum D so as to accommodate various widths of ply material and to permit the building of different size tires.

Mounted on the rigid supporting cylinders 13 and 14 are a pair of inflatable annular pneumatic bags in the form of substantially cylindrical elastic rubber tubes 20 which have a uniform width corresponding substantially to that of the cylinder 13. Means are provided for inflating both of the pneumatic tubes simultaneously during rotation of the drum D including suitable inlet connections and air conduits which extend axially through the drum as shown, for example, in said copending application and said patent.

The drum D is provided with durable expansible metal shell means of cylindrical form to cover the pneumatic annuli 20 and the annular space between said annuli. As herein shown, such shell means includes a multiplicity of narrow sheet metal strips 34 of substantially uniform width extending axially across and disposed around the pneumatic annuli 20. Each of the strips 34 has substantially segmental end portions 35 at its opposite ends that project radially inwardly beyond the rigid rotatable cylinders 13 and substantially engages the opposite ends of said cylinders. The radially inner ends of the segmental portions 35 are bent axially inwardly to form arcuate flanges or hooks 36 which support expansible and contractible annular helical garter springs 37 concentric to the cylinders 13 and radially inwardly of the end portions of said cylinders.

The garter springs 37 bias the metal strips 34 radially inwardly to hold them against the external cylindrical surface of the annular pneumatic air bags 20 and collapse said bags when the air pressure therein is reduced by exhausting the air. The garter springs also engage the inner cylindrical surfaces of the cylinders 13 at the opposite ends thereof when the air bags are expanded to limit the radical outward movement of the strips 34 and to position the axially extending portions of said strips so as to form an outer cylindrical metal shell concentric to said cylinders 13 and the shaft 5.

The annular spaces between the air bags 20 may be covered by a plurality of substantially coaxial arcuate members of substantially uniform axial width, for example, as shown in the aforesaid Patent No. 2,614,952. As herein shown, the strips 34 have stepped portions 41 to receive the opposite end portions of spanning members which are in the form of arcuate flexible sheet metal members 43 of uniform width. The members 43 fit on the stepped portions 41 with their external cylindrical surfaces flush with the exterior surfaces of the strips 34, whereby the drum D is externally cylindrical as described in more detail in the aforementioned copending application. The arcuate members 43 completely cover the space between the pneumatic annuli 20 and cooperate with the strips 34 to provide an expansible and contractible cylindrical metal shell for the drum D which completely covers said annuli 20.

The tire building machine has bead placing means for positioning the tire bead rings over the projecting end portions of the tire fabric adjacent the drum shoulders. The bead placing means includes a pair of annular metal bead-supporting members 50 and 51 having thin cylindrical resilient flexible sheet metal strips 52 of uniform width for supporting a pair of conventional inextensible rubber-coated metal bead rings 53. The flexible strips 52 project axially inwardly from the annular bead-positioning members 50 and 51 a distance less than the axial width of the bead rings 53 so as to provide externally cylindrical surfaces for supporting said rings and for holding said rings concentric to the members 50 and 51.

The bead-supporting members 50 and 51 are pivotally mounted on U-shaped metal bead-ring frames 55 which may be moved axially toward and away from the shoulders of the drum D as described in the aforesaid copending application so as to place the bead rings 53. Said rings may be pressed against the rubberized fabric on the drum either before or after the drum has been expanded by inflating the bags 20. As shown herein, a series of fabric layers 118 are applied to the drum with their end edges in staggered relation. The drum D is then expanded to the position shown in Fig. 5 and the bead rings 53 are passed axially inwardly over the projecting end portions 119 of the fabric against the shoulders of the drum to stick the bead rings to the rubber of said fabric end portions.

Means is provided for turning or lapping the end portions 119 of the fabric over the bead rings 53 after the rings have been positioned on the fabric including a series of regularly circumferentially spaced curved radial metal turnover fingers or arms 84 at the opposite ends of the drum D which are moved over the shoulders of the drum by an actuating means including a pair of annular metal actuating members 85 mounted for axial sliding movements on the shaft 5. Said actuating members may be moved axially on the shaft 5 by a motor and suitable rack-and-pinion means for example as disclosed in the aforesaid copending application.

As herein shown, eight regularly circumferentially spaced turnover fingers 84 are sufficient since the drum D is small, but a larger number of fingers is preferred for making large tires. Each of the turnover fingers 84 is generally arcuately curved and is provided with a socket 130 of a size to receive a helical annular metal garter spring or stitching ring 105 at its outer end which may be expanded over the drum D.

The enlarged inner end portion of each finger 84 has an elongated slot 188 which receives a cylindrical pivot pin 106, said pin being carried by a yoke or U-shaped bearing bracket 107. The brackets 107 are regularly spaced around the peripheries of the actuating members 85 and are rigidly connected thereto by bolts or attaching screws 108.

Each slot 188 is elongated axially, the major portion thereof being parallel to the axis of the shaft 5 when the actuating pins 106 are in their axially innermost positions. The slot has a width substantially equal to the diameter of the pins 106 so that each pin may move from one end of its associated slot to the other.

The turnover fingers 84 at each end of the drum D are swung radially about their pivots 106 to expand the two helical garter springs 105 over the opposite end shoulders of the drum in response to axial movement of the actuating members 85, said springs serving as stitching rings to lap the fabric end portions 119 over the bead rings 53 and to adhere said end portions to the underlying fabric 118.

Means are provided to swing the turnover fingers 84 radially in unison including a pair of large annular metal stop members 109 rigidly connected to the cantilever shaft 5 beyond the opposite ends of the drum D and held against axial movement relative to the drum. The stop members 109 have an external diameter no greater than that of the annular members 13 and are located so that they do not interfere with movement of the bead-supporting members 50 and 51.

Cam members 112 and 113 are mounted on the stop members 109 at opposite ends of the drum D to provide pivots or fulcrums for the turnover fingers 84. Each cam member 112 is in the form of an annular externally cylindrical roller that is mounted for rotation on a cylindrical pin 189 parallel to the pin 106 associated with the turnover finger which engages said roller. The pins 189 are rigidly mounted on brackets 190 which are rigidly connected to the stop members 109 by attaching screws or bolts 191. The cam rollers 112 are regularly spaced around the circumference of each stop member 109 and are located the same radial distance from the axis of the shaft 5 so as to move the turnover fingers 84 in unison while holding the stitching rings 105 perpendicular to the drum axis and concentric to the drum.

Each fulcrum rod 113 is in the form of an endless circular ring of circular cross section and is supported concentric to the shaft 5 and perpendicular to the drum axis by regularly spaced longitudinal supporting bars or rods 110. The rods 110 are welded at their inner ends to the fulcrum rings 113 and are adjustably and rigidly connected to the stop members 109 by hexagonal nuts 193 which are screwed on the threaded portions of the rods 110. The rings 113 are located axially inwardly of the outer portions of the fingers 84 between the fingers and the ends of the drum D. The radius of each ring 113 is substantially greater than the distance from each cam roller 112 to the axis of the drum shaft so that said ring provides a pivot for each turnover finger radially outwardly of the pivot provided by the cam roller. The fingers 84 are identical and are provided with smoothly curved substantially arcuate outer and inner cam surfaces 114 and 115 for engaging the axially projecting portions of the fulcrum members 112 and 113.

Figure 2:
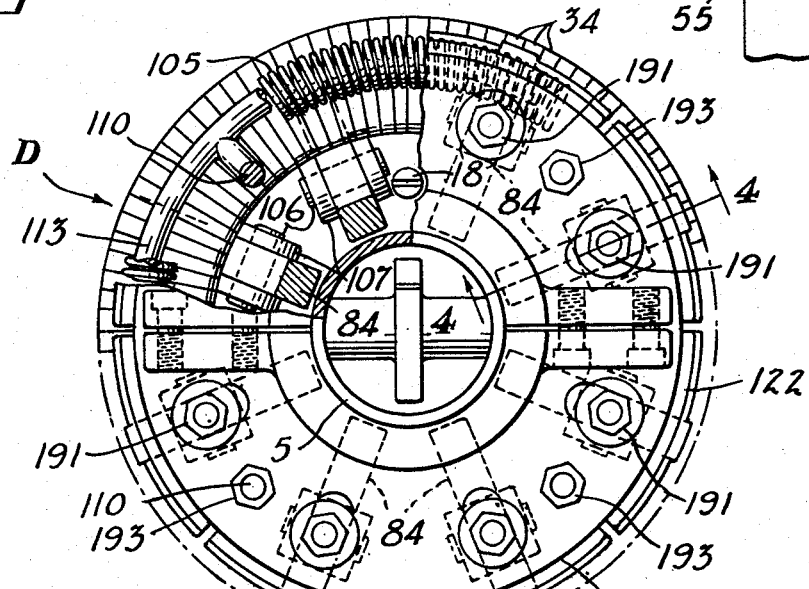
Figure 2 is an end view of the machine of Fig. 1 on a larger scale with parts broken away and parts shown in section.
Figure 3:
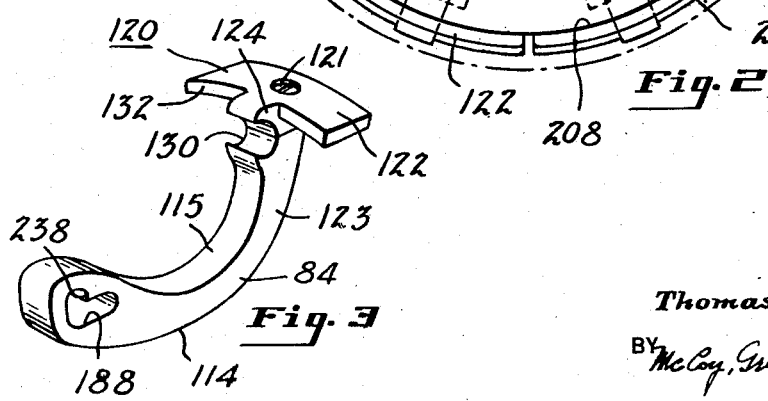
Figure 3 is a perspective view on a reduced scale showing one of the turnover fingers of the machine of Figs. 1 and 2.

Each of the fingers 84 has a segmental fabric engaging portion in the form of an arcuately curved supporting shoe or plate 120 extending transversely of the finger and extending axially in a direction away from the stitching ring as shown in Figures 2, 3 and 4 which are drawn substantially to scale. Each of the shoes 120 is rigidly mounted at the end of a turnover finger 84 by means of a cap screw 121, the shoe having a central opening of a size to receive the head of the cap screw so that said head is below the fabric-engaging surface of the shoe. Each shoe 120 has a segmental portion 122 of generally rectangular shape and uniform thickness substantially perpendicular to the intermediate portion 123 of the finger, an axially projecting nose portion 124 of the same thickness as the portion 122 midway between the ends of the portion 122 and vertically aligned with the portion 123, and a central downwardly projecting portion 125 of the same width as the portions 123 and 124 and aligned with said portions. The flat bottom surface of the portion 125 is held by the cap screw 121 against the flat upper surface of the arm portion 123, the portions 123, 124 and 125 of the turnover finger 84 providing a cylindrically curved socket 130 of substantially the same radius as the garter spring 105 for receiving said spring. The socket of each turnover finger 84 extends more than half way around the garter spring 105 as shown in Fig. 4 to hold the spring against axial movement. The nose portions 124 extend axially over the garter springs 105 as best shown in Fig. 1, the axially inner edges of the segmental portions 122 being located at the outer surface of the garter spring 105 and the axially outer edges of the portions 122 being spaced from the centrally located portion 125 as shown in Fig. 4.

The method of building a tire on the drum D is substantially the same as disclosed in the aforesaid copending application. The drum is rotated first in one direction and then the other as strips of bias-cut tire cord fabric are applied on the drum to form an annular rubber-impregnated fabric layer 118 having end portions 119 that extend beyond the opposite ends of the drum, the end edges of the fabric plies being staggered so that the end portions 119 are stepped.

After the cylindrical layer 118 is applied to the drum, the drum is expanded and the inextensible rubber-coated bead rings 53 are pressed by the bead-placing members 50 and 51 against the fabric on the shoulders of the drum. The bead-placing members are then withdrawn and the actuating members 85 are moved axially outwardly from their retracted positions shown in Figs. 1, 4 and 5.

During the first portion of the movement of the actuating members, the pin 106 of each finger 84 moves axially from a position at the inner end of the slot 188 to a position at the outer end of said slot. As the pins 106 continue their axial outward movement, the outer surfaces 114 of the turnover fingers move radially outwardly to rotate the cam rollers 112 and the fingers are swung radially to move the garter spring 105 radially outwardly and axially inwardly over the bead ring 53. As the fingers move radially outwardly as shown in Fig. 6, the garter springs 105 assume a substantially polygonal form because of the tension on the springs. As the fingers swing over the drum shoulders the garter springs 105 contract to press the end portions 119 against the underlying fabric 118 on the drum, such contraction moving the fingers 84 a short distance radially inwardly so that the pins 106 are spaced from the ends of the slots 188 as shown in solid lines in Fig. 7.

After the end portions 119 have been turned over the bead rings, the actuating members 85 are moved axially inwardly to retract the fingers. It is preferable to provide a substantially semi-circular notch 238 at the inner end of each slot 188 to hold the cam pin 106 at said end during the initial portion of the finger retraction and to expand the garter spring as it moves axially outwardly over the cuffed end portion 119. The inner curved surface 115 of each finger 84 engages the circular fulcrum ring 113 as shown in dot-dash lines in Fig. 7 as the actuating members 85 are retracted. A layer of tread rubber may then be applied to the fabric on the drum as disclosed in the aforesaid copending application and said Patent No. 2,614,952.

When the actuating members 85 are retracted and the pins 106 are at the axially inner ends of the slots 188 as shown in Fig. 4, the cylindrically curved bottom surfaces 208 of the segmental portions 122 rest on the cylindrical outer surfaces 209 of the rigid members 109. The members 109 therefore serve as stops to limit the radial swinging movement of the fingers 84.

When the fingers are in their radially innermost positions with the portions 122 resting on the surfaces 209, the portions 122 are arranged end to end to form a segmental fabric-supporting ring R having a generally cylindrical fabric-engaging surface of uniform axial width, said surface having a diameter greater than that of the rigid members 13 and slightly less than (or equal to) the external diameter of the drum D when the drum is contracted as shown in Figs. 1 and 4. Said fabric-engaging surface extends substantially throughout the circumference of the ring R since the maximum width of each space between adjacent segmental portions 122 is less than one-quarter of an inch (and preferably less than one-eighth of an inch). The axial width of said fabric-engaging surface is preferably about one and one-half to two inches so as to provide a rigid support for the stepped fabric end portions 119. As shown in Fig. 4, the staggered end edges of the fabric plies applied to the drum are supported by the rings R so as to prevent sagging of the fabric between adjacent fingers 84 as would be the case if the shoes 120 were omitted as in the aforesaid copending application. As shown herein, the fabric-engaging surface of the ring R is slightly frusto-conical so that the fabric end portions 119 taper slightly to reduce the likelihood of said end portions interfering with axial movement of the bead-placing rings 50 and 51.

A tire building machine of the type shown herein having eight turnover fingers may be employed to make small tires, such for example as industrial truck tires wherein the bead rings have a diameter of about six to twelve inches. When making such tires the fabric end portions 119 may extend axially about 2½ to 3½ inches beyond the shoulders of the drum D. The central vertical plane of each garter spring 105 is generally spaced axially from the drum shoulder at 35 a distance of about ¾ to 1½ inches when the spring is in its normal contracted position leaving a space between the garter spring and said shoulder. The coils of the helical garter spring usually have a diameter of about three-fourths of an inch to one inch. The arched segmental portions 122 of the fabric-engaging shoes have a uniform axial width of about 1 to 2 inches and are spaced axially from the drum shoulders at 35 a distance of about 1 to 2 inches when the fingers 84 are retracted as shown in Figs. 1 and 4 so as to support the fabric end portions. The flat axially-inwardly-directed faces 132 of the lateral extensions 122 are shown herein as being axially outwardly of the garter springs 105 when the fingers are retracted, but said faces may be as close to the drum as the nose portions 124 provided they do not interfere with the action of the garter springs.

The arm portions 123 of the turnover fingers are regularly widely spaced circumferentially so that there is a substantial space of several inches between adjacent arm portions 123 when the fingers are retracted. Each of the arched lateral extensions 122 preferably extends circumferentially a distance not materially less than that between adjacent arm portions 123 so that the distance between adjacent extensions 122 is a small fraction of an inch. As herein shown, each lateral extension 122 extends almost three inches circumferentially and is spaced one-sixteenth of an inch from the adjacent extensions 122.

The ring R greatly speeds up the operation of the tire building machine and improves the quality of the tires. Where the shoes 120 are omitted and the stepped ends of the fabric are unsupported between the turn-over fingers, the fabric sags between the fingers as it is applied to the drum and the adjacent plies are not properly positioned beyond the ends of the drum. The fabric therefore tends to be wavy and uneven after it is turned over the bead rings and is not pulled tightly against the bead rings throughout the circumference of the tire. The quality of the tire can be improved somewhat by slowing down production and positioning the end portions of the fabric plies manually before and after these portions are cuffed over the bead rings, but such a procedure substantially increases the cost of manufacture.

By employing the shoes 120 on the fingers 84, it is possible to eliminate the unevenness of the fabric between the turnover fingers and to pull the fabric tight around the bead rings so as to provide highest quality tires without slowing down production by handling the fabric manually. The fingers 84 and their lateral extensions 122 engage the fabric end portions 119 at closely spaced points so as to eliminate sagging of the fabric between the fingers as it is applied to the drum. As the fingers are moved radially outwardly as shown in Fig. 6, the extensions 122 push the fabric outwardly between the arm portions 123 of the fingers so that the fabric is pulled tightly around the bead rings 53, stitching rings 105 at this time being of polygonal form in the position of Fig. 6 so that they cannot exert a tension on the portions of the fabric between fingers. As the stitching ring contracts and moves axially inwardly, it assumes an annular shape and presses the fabric against the drum as in Fig. 7. The shoes 120 and the stitching rings 105 provide an ideal means for lapping the fabric end portions over the bead rings and permit the manufacture of highest quality tires at high speed.

It will be understood that, in accordance with the provisions of the patent statutes, variations and modifications of the specific devices shown herein may be made without departing from the spirit of the invention.

Having described my invention, I claim:

1. In a tire building machine having a generally cylindrical drum for receiving a plurality of fabric layers with end portions extending axially beyond the shoulders of the drum, and means for positioning the bead rings over the fabric end portions and for pressing the bead rings against the fabric end portions, improved fabric lapping means for turning the end portions of the fabric layers radially outwardly and axially inwardly over the bead rings and the ends of the drum comprising: an expansible and contractible resilient stitching ring near each shoulder of said drum, means for supporting said ring and for expanding and contracting the ring over the drum including a series of circumferentially spaced turnover fingers and means for actuating said fingers in unison to move the stitching ring radially outwardly and axially inwardly over the bead ring and over the ends of the drum while holding the stitching ring concentric to the drum, each of said fingers being spaced a substantial distance from the adjacent fingers and having a fabric-engaging lateral extension mounted thereon, the lateral extensions of adjacent fingers being spaced apart circumferentially a distance which is a small fraction of the distance between said adjacent fingers when the fingers are retracted and in their normal innermost positions, the fabric-engaging portions of said turnover fingers and said lateral extensions being positioned adjacent the stitching rings for engaging the fabric end portions at closely spaced points around the periphery of the fingers so that the fabric is pulled tightly around the bead rings as the fingers move over the shoulders of the drum.

2. In a tire building machine having a generally cylindrical drum for receiving a plurality of fabric layers with end portions extending axially beyond the shoulder of the drum, and means for positioning the bead rings over the fabric end portions and for pressing the bead rings against the fabric end portions, improved fabric lapping means for turning the end portions of the fabric layers radially outwardly and axially inwardly over the bead rings and the ends of the drum comprising: an expansible and contractible resilient annular stitching ring near each shoulder of said drum, means for supporting said ring and for expanding and contracting the ring over the drum including a series of circumferentially spaced turnover fingers and means for actuating said fingers in unison to move the stitching ring radially outwardly and axially inwardly over the bead ring and over the ends of the drum while holding the stitching ring concentric to the drum, each of said fingers having a segmental fabric-engaging portion at its outer end extending transversely of the finger and extending axially from the adjacent stitching ring in a direction away from the drum, said segmental portions being arranged end to end circumferentially to form a segmental ring having a generally cylindrical fabric-engaging surface when said segmental portions are in their radially innermost positions, the fabric end portions resting on said surface before they are turned over the beads and against the drum.

3. In a tire building machine having a frame, a cantilever shaft mounted for rotation on said frame, a generally cylindrical expansible and contractible drum mounted on said shaft for receiving a plurality of fabric layers with end portions extending axially beyond the shoulders of the drum, means for radially expanding the drum, and means carried by the frame for positioning the bead rings over the fabric end portions and for pressing the bead rings against the fabric end portions, improved fabric lapping means for turning the end portions of the fabric layers radially outwardly and axially inwardly over the bead rings and the ends of the drum comprising: an expansible and contractible resilient annular stitching ring near each shoulder of said drum and means for supporting said ring and for expanding and contracting the ring over the drum including a series of regularly circumferentially spaced turn-over fingers, an actuating member mounted on said cantilever shaft within said drum for axial movement on said shaft, and a rigid member mounted on said shaft and held against axial movement on said shaft, each of said fingers comprising a rigid generally arcuate member extending radially outwardly between said rigid member and said drum from said actuating member to said stitching ring and curved inwardly toward said drum, means pivotally connecting the inner end of each turn-over finger to the actuating member and the outer end of each finger to the stitching ring, said fingers holding the stitching ring concentric to said drum at all times, said rigid member having axially inwardly projecting portions providing fulcrums for engaging the axially outer surfaces of said fingers to swing the fingers radially substantially in unison in response to axial movement of said actuating member to move the stitching ring along a predetermined path from a position radially inwardly of an axially extending end portion of said fabric radially outwardly and axially inwardly over the drum to lap the fabric over the bead ring, each of said turn-over fingers having a fabric-engaging segment rigidly mounted on its outer end adjacent the stitching ring, said segments being arranged end to end to form a segmental ring having a generally cylindrical fabric-engaging surface when the stitching ring is contracted and said segments are in their radially innermost positions.

4. In a tire building machine having a cantilever shaft, a generally cylindrical expandable drum mounted on said shaft for receiving a plurality of fabric layers with end portions arranged in staggered relation and extending axially beyond the shoulders of the drum, means for radially expanding the drum, and means carried by said shaft for positioning inextensible bead rings over the fabric end portions adjacent the drum shoulders, improved fabric lapping means for turning the end portions of the fabric layers radially outwardly and axially inwardly over the bead rings comprising: a series of regularly circumferentially spaced curved turn-over fingers mounted at each end of said drum, each of said fingers having an elongated slot at its radially inner end, rigid members mounted on said shaft near opposite ends of said drum and held against axial movement relative to said drum, actuating members mounted on said shaft within said drum for movement axially toward and away from said rigid members and having horizontal pivot pins thereon that fit in the slots of said fingers, actuating means for moving said actuating members axially to move said pins along lines parallel to the axis of said shaft toward and away from said rigid members, an expansible and contractible stitching ring connected to the radially outer ends of the turn-over fingers near each end of said drum to resist radial outward movement of said outer ends, each of said rigid members having an axially inwardly projecting fulcrum portion substantially adjacent the line of movement of the pivot pin in each turn-over finger for engaging that finger to limit axial and vertical swinging movement thereof away from said drum, the fingers being shaped so as to move each stitching ring from a position below an axially extending end portion of said fabric radially outwardly and axially inwardly over the drum and into engagement with the fabric on the drum to lap the fabric over the bead rings as the pivot pins of the actuating members are moved axially outwardly toward said stop members and as the fingers move over and swing about said fulcrum portions, said pivot pins engaging the outer ends of the slots in said fingers during movement of the stitching rings toward said drum to cause each slot to move from a generally axial toward a generally radial position, said stitching rings engaging the lapped end portions of the fabric and being held against radial inward movement by the drum before the pivot pins reach their axially outermost positions so that the inner ends of said fingers move radially inwardly relative to said pivot pins and said pins approach the outer ends of said slots, and means for moving said stitching rings away from said drum and out of engagement with said fabric, each of said turn-over fingers having a segmental fabric-engaging portion extending transversely of the finger and extending axially from the adjacent stitching ring in a direction away from the drum, said segmental portions being arranged end to end to form a segmental ring having a generally cylindrical fabric-engaging surface when said segmental portions are in their radially innermost positions and said pins are at the inner ends of the slots.

5. In a tire building machine having a generally cylindrical drum for receiving a plurality of fabric layers with end portions extending axially beyond the shoulders of the drum, and means for positioning the bead rings over the fabric end portions and for pressing the bead rings against the fabric end portions, improved fabric lapping means for turning the end portions of the fabric layers radially outwardly and axially inwardly over the bead rings and the ends of the drum comprising: an expansible and contractible resilient stitching ring near each shoulder of said drum, means for supporting said ring and for expanding and contracting the ring over the drum including a series of circumferentially spaced turnover fingers and means for actuating said fingers in unison to move the stitching ring radially outwardly and axially inwardly over the bead ring and over the ends of the drum while holding the stitching ring concentric to the drum, each of said fingers being spaced a substantial distance from the adjacent fingers and having a fabric-engaging lateral extension mounted thereon, the lateral extension of each finger extending circumferentially a distance not materially less than the distance between that finger and the next adjacent finger when the fingers are retracted and in their normal innermost positions, the fabric-engaging portions of said fingers and said lateral extensions being positioned near the stitching rings for contacting the fabric end portions at closely spaced points around the periphery of the fingers and the extensions.

6. Fabric lapping means as defined in claim 4 wherein said rigid members have external generally cylindrical surfaces concentric to said shaft and said segmental portions rest upon said cylindrical surfaces when they are in their radially innermost positions.

References Cited in the file of this patent

UNITED STATES PATENTS

| | | |
|---|---|---|
| 2,488,863 | Haase | Nov. 22, 1949 |
| 2,503,815 | Frohlich | Apr. 11, 1950 |
| 2,614,952 | Kraft | Oct. 21, 1952 |